United States Patent [19]
Brown et al.

[11] 4,039,337
[45] Aug. 2, 1977

[54] RELEASE COATING FOR GLASS MANUFACTURE

[75] Inventors: Richard E. Brown; Archie L. Bickling, Jr., both of Boulder; Virgil R. Friebel, Longmont; Kent G. Roller, Boulder, all of Colo.

[73] Assignee: Ball Brothers Research Corporation, Boulder, Colo.

[21] Appl. No.: 670,605

[22] Filed: Mar. 26, 1976

Related U.S. Application Data

[63] Continuation-in-part of Ser. No. 517,262, Oct. 23, 1974, abandoned.

[51] Int. Cl.² .............................................. B28B 7/36
[52] U.S. Cl. ..................................... 106/38.28; 65/24; 65/26; 106/74; 106/84; 252/29; 252/30; 427/133

[58] Field of Search .................. 252/25, 23, 30, 22, 252/29; 106/38.3, 38.35, 38.22, 38.27, 38.28, 84, 74; 65/24, 26; 427/133

[56] References Cited

U.S. PATENT DOCUMENTS

| 3,051,586 | 8/1962 | Heath et al. | 250/30 |
| 3,052,629 | 9/1962 | Morrow et al. | 252/29 |
| 3,915,870 | 10/1975 | Brown | 252/30 |

*Primary Examiner*—Lorenzo B. Hayes
*Attorney, Agent, or Firm*—Gilbert E. Alberding

[57] ABSTRACT

A composition and method of preparation are herein described for molten release and parting compositions adaptable for use in glass-forming operations. The novel composition comprises an aqueous dispersion of a mixture of a solid lubricant, a water-soluble silicate binder, a setting agent, and a water-soluble phosphate. A preferred composition comprises a mixture of flake graphite, boron nitride, sodium silicate, zinc oxide and potassium phosphate tribasic.

6 Claims, No Drawings

RELEASE COATING FOR GLASS MANUFACTURE

CROSS-REFERENCES TO RELATED APPLICATIONS

The present application is a continuation-in-part of copending commonly assigned patent application Ser. No. 517,262, filed Oct. 23, 1974, now abandoned.

BACKGROUND OF THE INVENTION

1. Field of the Invention

The present invention relates to novel compositions of matter and methods of using said compositions. More particularly, it relates to compositions of matters useful as mold release and parting agents, for protecting and lubricating the surfaces of molds and other article-forming parts, especially such as are useful in the manufacture, forming and handling of glass articles or the like at high temperatures.

2. Description of the Prior Art

In glass manufacturing, a glob of molten glass is formed by a blank mold into a parison having a finished portion corresponding to the neck portion of the desired glass article. It is a requirement that the molding surface of the blank mold not become abraded or pitted so that the molten glass will readily flow over the molding surface of the mold, take the shape thereof, and then separate therefrom. Protection and lubrication are therefore required. It is known that the glob of molten glass delivered to a glass forming machine has an average surface temperature of about 1600° to 1700° F. Thereafter, during the final process of shaping and forming, the molten glass has cooled to a temperature between about 1250° and 1350° F. As can be appreciated, this cooling process renders the glass less plastic and often creates a dragging effect upon the molding surface of the equipment.

Several practices have been followed in the past for the protection and lubrication of such molds used in forming glass articles. Typically, it has been the practice to apply to such molds various compositions or dopes containing a graphite compound or the like suspended in a carrier. Often hydrocarbons of some type, such as kerosene have been used. Generally these compositions are applied by spraying, painting or swabbing during the forming operations so as to provide lubrication of the interacting mold sections and to prevent sticking of the molten glass to the mold surfaces. It will be appreciated that there are some drawbacks in such compositions containing hydrocarbons as well as their method of application. Since the glass molds are at an elevated temperature, the hydrocarbon materials are quickly driven off into the atmosphere. Aside from the obnoxious odors, the vaporized materials create considerable volumes of smoke which reduce visibility, and produce upon condensation serious fire hazards which often times become progressively worse as the accumulation increases. Further, the application of the composition to various moving parts of the machine in actual production must be regularly repeated a number of times on a regular basis which could result in injury to the operators. Needless to say, these disadvantages have required that the industry employ other solutions to circumvent these undesirable conditions. Further discussion of the long-existing problems with such compositions and efforts to avoid these problems can be found in U.S. Pat. Nos. 3,141,752; 3,480,422; 3,508,893; 3,523,016 and 3,623,856.

A number of aqueous systems have been employed with various degrees of success. Various mixtures and compositions employing inorganic binders have been used for coating molds for their protection in which water is used as a carrier. Illustrative of these aqueous formulations containing an inorganic binder is U.S. Pat. No. 1,568,234 which discloses a coating composition for protecting molds, the composition consisting of an inert refractory material such as clay, lampblack and a soluble silicate.

SUMMARY OF THE INVENTION

After investigation, it has been found compositions of matter which are thought advantageous in several respects over prior art compositions, particularly in their capacity to hold up and serve as a lubricant and parting agent under a wide range of rigorous commercial operations.

Accordingly, one aspect of the present invention provides effective compositions of matter suitable for coating molds used in casting or forming materials at high temperatures without emitting organic pollutants to the atmosphere.

A further aspect of the subject invention provides a parting and lubrication system which significantly minimizes periodic swabbing or treatment of surfaces which come into contact with hot glass bodies.

From another aspect the present invention provides an improved parting and lubrication system which minimize the necessity of using conventional swabbing of surfaces which come in contact with hot glass articles.

Still another aspect of the present invention is to provide a parting and lubricating system for glassware molds which may be conveniently applied away from and prior to the production process.

Yet still another aspect of the present invention is to provide a lubrication system for glassware molds which produces a glass article of excellent quality.

These and other aspects and features of the present invention will become apparent from the following description.

DETAILED DESCRIPTION OF THE INVENTION

According to the present invention, surfaces which come in contact with hot plastic fluids such as molten glass may be properly lubricated by a composition comprising an aqueous dispersion of a mixture of a solid lubricant, a water-soluble silicate binder, a setting agent, and a water-soluble phosphate. Also, this invention relates to a method of forming a lubricating and release coating on a surface which comes in contact with hot glass bodies in the manufacture of glass articles, comprising applying an aqueous dispersion of a mixture of a solid lubricant, a water-soluble silicate binder, a setting agent, and a water-soluble phosphate to said surface to be coated and removing the water from said dispersion to affix the coating thereon. As used herein, "dispersion" is used generically to include suspensions, solutions and mixtures.

The solid lubricant may be any of a large family of inorganic components which have high temperature resistance characteristics. Illustrative of such solid lubricants are graphite, boron nitride, silicon nitride and tungsten disulfide. The graphite may be any of the various particulate forms, such as flake, electrolytic and colloidal graphite or conventional graphite known to the trade. Further it is understood that either natural or synthetic forms of graphite, including flake graphite, can be satisfactorily employed in accordance with the present invention. While particle size of the graphite is not critical, particles ranging from 10 to 200 microns are useful, and preferably particle sizes less than 75 microns should be employed. The nitrides of boron and silicon are very suitable solid lubricants. Further, combinations of boron nitride and graphite are preferred solid lubricants. Generally, the particle size for such nitrides is between about 0.5 to 2 microns. The tungsten disulfide may also be employed, especially in a finely divided state, and generally, a particle size smaller than 2.0 microns is very suitable for the compositions herein described. It has been unexpectedly found that a combination of boron nitride and graphite renders a better and more effective release and lubricating composition. In particular, the amount of solid lubricants useful in the composition herein described may range from about 5 to 70 weight percent of the aqueous dispersion. Further, the weight ratio of graphite to boron nitride is critical. It has been found that the weight ratio of graphite to boron nitride may range from about 1:2 to about 5:1, and, more preferably from about 1:1 to about 3:1.

The water-soluble silicates used in the process and compositions of this invention are those silicates of inorganic bases. Exemplary of such silicates are sodium silicate, potassium silicate and lithium silicate. Also, the organic silicates may be satisfactorily employed and include guanidine silicate, tetramethylammonium and tetraethanolammonium silicate. The preferred silicate is sodium silicate. The silicate is readily available from commerical sources and includes aqueous solutions of sodium silicate having molar ratios of $SiO_2$ to $Na_2O$ from 1:1, in the case of sodium metasilicate, to as high as 3.9:1. Although the amount of silicate incorporated in the instant formulation may vary over a wide range, a preferred range is between about 10 to 40 weight percent of the aqueous dispersion.

It has been found essential to incorporate with the water-soluble silicate herein described a setting agent. In general the term setting agent as employed herein denotes certain compositions that greatly enhance the usefulness of the coating compositions. Although the setting agents seemingly function as curing agents for the silicate, they also apparently function as buffers to allow any water incorporated in the silicates or any water of crystallization to leave the coating surface upon drying. Seemingly, the setting agents serve to tie up any water momentarily so that there is no burst of steam or bubbling on the surface. In this regard, it is understood that the setting agents herein described enhance the silicate of this invention, although it is only hypothesized as to their specific functional characteristics. The setting agents used in the subject invention include zinc oxide, calcium chloride, magnesium sulfate, aluminum sulfate, sodium borate, sodium metaborate and sodium fluorosilicate, kaolinitic clays and minerals and mixtures thereof.

In the composition herein described it has been found a requirment to add phosphate component compound, said phosphate being water-soluble and neutral or alkaline when dissolved in water. Upon drying the phosphate component seemingly enhances the cohesive the retention properties of the silicate binder to a given surface. A most preferred phosphate is potassium phosphate tribasic.

In carrying out the process of this invention, it is generally desirable to clean the surface of the glass-forming equipment beforehand to remove all contamination such as metal oxides, loose particles, oil, dirt and the like to assure a better adhesion and longer life of the coatings.

In treating molds and mold parts including blank molds, rings and the like with the compositions herein, the application and subsequent drying of these compositions may be carried out in a straightforward manner. Simply, the treatment of such molds and mold parts consists in applying the aqueous dispersion described herein and allowing the water to be evaporated or removed by heating. It is understood that the water in the aqueous dispersion may be removed by any number of convention means. Subjecting the compositions herein to temperatures between about 300° and 400° F. generally for a period of 30 minutes to one hour serves to adequately remove the water. The dispersions of the subject invention may be applied to the surface which contacts the hot plastic glass body by any of the normal or conventional means such as brushing, spraying, dipping, or blowing onto the surface. Spraying is preferred.

After removing the water from the mixture the release and lubricating compositions form a coating which adheres tenaciously to the surface in a thin, uniform coating. The coating thickness may vary considerably depending upon, of course, the amount applied and may range between 0.5 and 5 mils. The coating itself is thermally stable, offers good oxidation resistance and allows for good heat transfer. Further, the compositions herein discussed are very effective in producing glass articles of excellent quality.

While the heating operation serves to drive off any water or other volatile constituents, it also sets the silicate and stabilizes the solid lubricant in the form of disseminated particles upon the surface with the result that a firmly adherent coating is produced. Because of the firm adherence and durability of the coating obtained in the foregoing manner, it is integrally bonded to such surfaces as compared to many superficial mold coatings and compositions of the prior art.

It is often found that wetting agents may be used in conjunction with the foregoing compositions. Wetting agents may be readily employed to facilitate dispersion of the solid lubricants and to stabilize the resulting dispersion. A wide range of wetting agents is available and any of the conventional wetting agents can be utilized in conjunction with the subject invention.

The thickness of the dry coating may vary over a wide range but generally a thickness of about 0.5 to about 5 mils is advantageous. In general, the amount of graphite on a treated surface may range from about 25 to about 45 weight percent, the boron nitride from about 15 to about 25 weight percent; the binder from about 25 to 35 weight percent; the setting agent from about 4 to 7 weight percent; and the water-soluble phosphate from about 3 to about 5 weight percent.

In addition, thixotropic agents and the like may also be employed to achieve a desired fluidity. The preferred thixotropic agent is sodium bentonite. Further, a filler such as diatomaceous earth may be included.

The results obtained through use of the aforedescribed compositions demonstrate that the ordinary operational life on conventional machines is many times greater than the operational life of other coatings. Further, by the composition herein discosed and claimed, there is produced great savings in time and cost since it is now possible to operate glass-forming and handling equipment for considerably longer periods of operational time, as well as to appreciably minimize the necessity of hand swabbing the molding equipment and other portions thereof that come in contact with hot glass bodies.

Although the present formulation and methods are addressed particularly to glass-forming machines and associated parts, it will be appeciated that such compositions and methods are also very useful for molds and the like when parting and lubricating are necessary. Thus, the herein described composition may be useful in the metal forming industries such as for zinc, alminum, and alloys thereof.

The following EXAMPLES are offered to illustrate the invention in detail:

EXAMPLE I

An aqueous dispersion comprising 31.8 weight percent sodium silicate, 25.4 weight percent graphite, 1.4 weight percent sodium bentonite, 5.6 weight percent potassium phosphate tribasic, 5.1 weight percent zinc oxide, 0.43 weight percent sodium alkyl sulfate and 30.1 weight percent water was made by adding 7.3 lb. sodium silicate (52° Baume), 5.9 lb. flake graphite, 0.33 lb. sodium bentonite, 1.3 lb. potassium phosphate tribasic, 1.2 lb. zinc oxide, 0.1 lbs. sodium alkyl sulfate with constant mixing with 6.9 lb. of water in a conventional ball mill for about 30 hours.

The aqueous dispersion was lightly sprayed by a spray gun over a cleanly prepared metal surface of a blank mold. The coated mold was placed in an oven for 30 minutes at 350° F. The treated mold had a coating comprising 29.7 weight percent sodium slicate, 47.6 weight percent graphite, 2.68 weight percent sodium bentonite, 10.56 weight percent potassium phosphate and 9.50 weight percent zinc oxide. The thickness of the dried coating was about 2 mils.

The treated blank mold was used to produce glass bottles without any swabbing. The coated mold performed satisfactorily and was used continuously for about 20 hours.

EXAMPLE II

An aqueous dispersion comprising 27.4 weight percent sodium silicate, 21.9 weight percent boron nitride, 1.2 weight percent sodium bentonite, 4.8 weight percent potassium phosphate tribasic, 4.3 weight percent zinc oxide, 0.20 weight percent sodium alkyl sulfate and 40.3 weight percent water was made by adding 4.8 lb. sodium silicate (52° Baume). 3.8 boron nitride, 0.21 lb. sodium bentonite, 0.83 lb. potassium phosphate tribasic, 0.7 lb. zinc oxide, 0.03 lbs. sodium alkyl sulfate with constant mixing with 7.0 lbs. of water in a conventional ball mill for about 30 hours.

The aqueous dispersion was lightly sprayed by a spray gun over a cleanly prepared metal surface of a blank mold. The coated mold was placed in an oven for 30 minutes at 350° F. The treated mold had a coating comprising 29.8 weight percent sodium silicate, 47.8 weight percent boron nitride, 2.6 weight percent sodium bentonite, 10.4 weight percent potassium phosphate and 9.3 weight percent zinc oxide. The thickness of the dried coating was about 2 mils.

The treated blank mold was used to produce glass bottles without any swabbing. The coated mold performed satisfactorily and was used continuously for about 20 hours.

EXAMPLES III

An aqueous dispersion comprising 23.5 weight percent sodium silicate, 4.5 weight percent boron nitride, 13.6 weight percent graphite, 1.0 weight percent sodium bentonite, 4.2 weight percent potassium phosphate tribasic, 3.5 weight percent zinc oxide, 0.4 weight percent sodium alkyl sulfate and 48.5 weight percent water was made by adding 45 lb. sodium silicate (52° Baume), 8.7 lb. boron nitride and 26.0 lb. graphite, 1.9 lb. sodium bentonite, 8.1 lb. potassium phosphate tribasic, 6.8 lb. zinc oxide, 0.7 lb. sodium alkyl sulfate with constant mixing with 93 lb. water in a conventional ball mill for about 30 hours. Here, the ratio of graphite to boron nitride is 2.99 to 1.

The aqueous dispersion was lightly sprayed by a spray gun over a cleanly prepared metal surface of a blank mold and a finish mold. The coated mold was placed in an oven for 30 minutes at 350° F. The treated mold had a coating comprising 30.4 weight percent sodium silicate, 11.8 weight percent boron nitride and 35.1 weight percent graphite, 2.6 weight percent sodium bentonite, 10.9 weight percent potassium phosphate and 9.2 weight percent zinc oxide. The thickness of the drid coating was about 2 mils.

The treated blank mold and finish mold were used to produce glass bottles without any coating. The coated mold performed satisfactorily and was used continuously for about 35 hours. The finish mold was continuously used for more than 60 hours.

EXAMPLE IV

An aqueous dispersion comprising 21.3 weight percent sodium silicate, 6.7 weight percent boron nitride, 13.2 weight percent graphite, 0.4 weight percent sodium bentonite, 1.4 weight percent potassium phosphate tribasic, 1.8 weight percent zinc oxide, 0.2 weight percent sodium alkyl sulfate and 54.6 weight percent water was made by adding 41 lbs. sodium silicate (52° Baume), 13.0 lb. boron nitride and 25.2 lb. graphite, 0.8 lb. sodium bentonite, 2.6 lb. potassium phosphate tribasic, 3.6 lb. zinc oxide, 0.4 lb. sodium alkyl sulfate with constant mixing with 105.0 lb. water in a conventional ball mill for about 50 hours. Here, the ratio of graphite to boron nitride is 1.94 to 1.

The aqueous dispersion was lightly sprayed by a spray gun over a cleanly prepared metal surface of a blank mold and a finish mold. The coated mold was placed in an oven for 30 minutes at 350° F. The treated mold had a coating comprising 29.6 weight percent sodium silicate, 19.9 weight percent boron nitride and 38.7 weight percent graphite, 1.3 weight percent sodium bentonite, 3.9 weight percent potassium phosphate and 5.5 weight percent zinc oxide. The thickness of the dried coating was about 2 mils.

The treated blank mold and finish mold were used to produce glass bottles without any swabbing. The coated mold performed satisfactorily and was used continuously for about 40 hours. The finish mold was continuously used for more than 60 hours.

We claim:

1. A release and lubricating composition capable of rendering release and lubricating characteristics in excess of twenty hours during glassware manufacture at temperatures in excess of 1600° F., said composition consisting essentially of an aqueous dispersion of a mixture of boron nitride and graphite as solid lubricants, said solid lubricants being present in an amount between about 5 and 70 weight percent of the aqueous dispersion, the weight ratio of said graphite to boron nitride being between a range of about 1:2 to about 5:1, a water-soluble silicate binder, said binder being present in an amount between about 10 and 40 weight percent, a setting agent for said silicate binder, said setting agent being present in an amount between about 0.05 and about 15 weight percent, and a water-soluble phosphate, said phosphate being present in an amount between about 1 and about 25 weight percent.

2. A release and lubricating composition as recited in claim 1 wherein the boron nitride has a particle size of between about 0.5 and about 2 microns and graphite has a particle size of between about 10 and about 200 microns.

3. A release and lubricating composition as recited in claim 1 wherein the said water-soluble binder is an alkali metal silicate.

4. A release and lubricating composition as recited in claim 1 wherein the setting agent is a member selected from the group consisting of zinc oxide, calcium chloride, magnesium sulfate, aluminum sulfate, sodium borate, sodium metaborate, sodium fluorosilicate, kaolinitic clays and mixtures thereof.

5. A release and lubricating composition as recited in claim 1 wherein the water-soluble phosphate is potassium phosphate.

6. A release and lubricating composition for forming molten glass at temperatures above about 1600° F., said composition capable of rendering release and lubricating characteristics in excess of twenty hours, said composition consisting essentially of an aqueous dispersion of a mixture of about 5 to 70 weight percent of solid lubricants comprising graphite and boron nitride, the particle size of said boron nitride being between about 0.5 and 2 microns and the particle size of said graphite being between about 10 and 200 microns, the weight ratio of said graphite to boron nitride being between a range of about 1:2 to about 5:1, about 10 to 40 weight percent of sodium silicate binder, about 0.5 to 15 weight percent of a setting agent selected from the group consisting of zinc oxide, calcium chloride, magnesium sulfate, aluminum sulfate, sodium borate, sodium metaborate, sodium fluorosilicate, kaolinitic clays and mixtures thereof, 1 to 25 weight percent of potassium phosphate and about 0.01 to 3 weight percent of a wetting agent.

* * * * *